United States Patent [19]

Fritsche et al.

[11] Patent Number: 5,332,977
[45] Date of Patent: Jul. 26, 1994

[54] POWER SUPPLY CIRCUIT FOR AN ACTIVE ANTENNA OF A VEHICLE RADIO

[75] Inventors: Knut Fritsche, Celle; Hans-Günther Scholz, Hildesheim, both of Fed. Rep. of Germany

[73] Assignee: Blaupunkt Werke GmbH, Hildesheim, Fed. Rep. of Germany

[21] Appl. No.: 20,104

[22] Filed: Feb. 19, 1993

[30]   Foreign Application Priority Data

Mar. 4, 1992 [DE]  Fed. Rep. of Germany ....... 4206731

[51] Int. Cl.⁵ .............................................. H03F 3/04
[52] U.S. Cl. .................................. 330/297; 330/298; 330/207 P
[58] Field of Search ............ 330/296, 297, 298, 207 P; 455/143, 205, 286, 287, 297, 299, 345

[56]         References Cited

U.S. PATENT DOCUMENTS 3,965,426  6/1976  Ringland ............................. 325/375

FOREIGN PATENT DOCUMENTS 2236305  11/1973  Fed. Rep. of Germany .
9114008   2/1992  Fed. Rep. of Germany .
0001219   1/1988  Japan .................................. 330/297
WO91/193-
    48A1  12/1991  World Int. Prop. O. .

OTHER PUBLICATIONS

Siegfried W. Best, *Aktive Antennen für DX-Empfang* [Active Antennas for DX-Reception], RPB Electronic Pocket Book, published by Frantzis publishing house, Germany, 1982, pp. 85-86 and FIG. 3.26, showing arrangement of supplemental power supply circuit and broadband amplifier between active antenna and receiver input.

*Primary Examiner*—James B. Mullins
*Assistant Examiner*—J. Dudek
*Attorney, Agent, or Firm*—Frishauf, Holtz, Goodman & Woodward

[57]          ABSTRACT

A power supply circuit provides power to an antenna amplifier (4) of a vehicle radio via the antenna bushing (A) and the antenna cable (6). The circuit is resistant to short-circuits and has a pair of signal terminals (K2, K3) from which information, about the type of attached antenna and about its operating state, can be picked up.

5 Claims, 1 Drawing Sheet

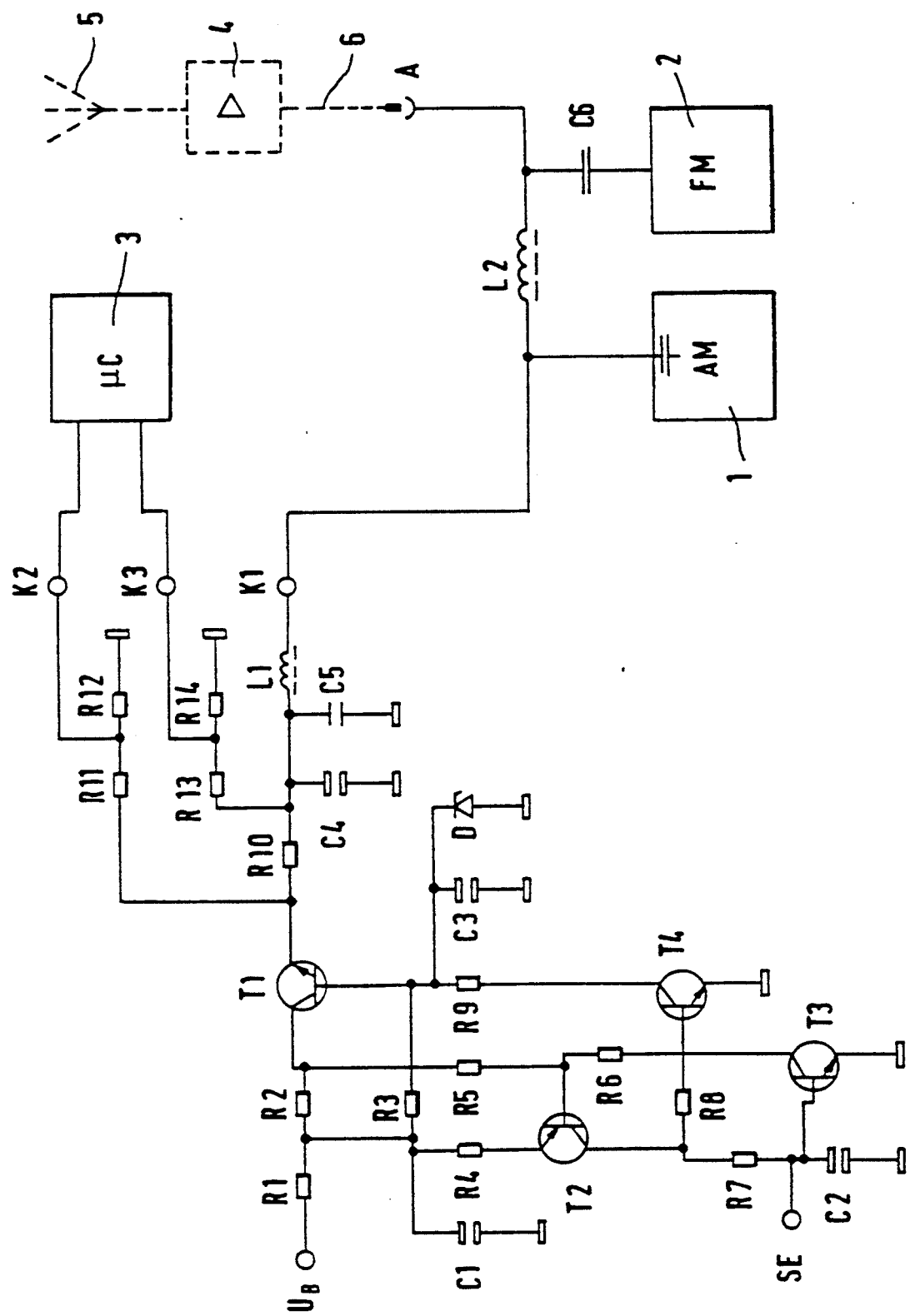

POWER SUPPLY CIRCUIT FOR AN ACTIVE ANTENNA OF A VEHICLE RADIO

FIELD OF THE INVENTION

The present invention relates generally to a power supply circuit for an antenna amplifier, and, more particularly, to such a circuit which provides power sufficiently filtered to avoid interfering with radio reception in a motor vehicle.

BACKGROUND

If a motor vehicle has a so-called "active" antenna, i.e. an amplifier-equipped antenna, this must be supplied with operating voltage. This operating voltage is conventionally supplied through a cable connected to an operating voltage terminal.

It is known, in stationary installations like household antennas, to use the antenna cable to supply operating voltage to an antenna amplifier, with coupling-in and coupling-out carried out using filters provided for this purpose. However, due to the substantial noise pulses which are common at the operating voltage terminals in motor vehicles, it has heretofore been necessary to refrain from double use of the antenna cable, and to supply operating voltage to the antenna amplifier by a separate cable.

THE INVENTION

Accordingly, it is a primary object of the present invention to provide a power supply circuit for a vehicle radio which makes it possible to connect, to the antenna bushing, an antenna which includes an antenna amplifier, which is fed its operating voltage via the antenna cable.

The advantage of the present invention is that one can omit an extra cable for the purpose of supplying power to the antenna amplifier, that both active and passive antennas can be connected to the same circuit, and that an excessive current flow causes automatic shutoff of the power supply. Further, signal terminals are provided, which supply information about the operating state and about the type of antenna which has been connected to the antenna bushing.

Briefly, this is accomplished by including a first transistor in the current path of a filter circuit between the vehicle operating voltage terminal and the antenna bushing. This first transistor can be made to block whenever a protective circuit detects a short circuit or other excessive current flow.

Further, a control input permits placing the power supply circuit, selectively, in either of two stable states. A microprocessor is provided for detection of which operating state the circuit is in, and which kind of antenna is currently connected.

DRAWING

The single FIGURE illustrates a preferred embodiment of the power supply circuit of the present invention.

DETAILED DESCRIPTION

An operating voltage terminal $U_B$ of a vehicle radio (not shown) is connected to the collector of a first transistor T1 (preferably of the NPN type) via a filter resistor R1 and a second resistor R2. A junction point between R1 and R2 is connected to one terminal of a first filter capacitor C1, whose other terminal is connected to ground. This junction point is also connected through a third resistor R3 to the base of first transistor T1, and through a fourth resistor R4 to the emitter of a second transistor T2 (preferably of the PNP type).

The base of second transistor T2 is connected through a fifth resistor R5 to the collector of first NPN transistor T1, and through a sixth resistor R6 to the collector of a third transistor T3 (preferably also of the NPN type). The emitter of T3 is connected to ground.

The base of T3 is connected to a control input terminal SE. Terminal SE is also connected through a second capacitor C2 to ground, and through a seventh resistor R7 to the collector of NPN second transistor T2. The collector of T2 is also connected through an eighth resistor R8 to the base of a fourth transistor T4 (preferably of the NPN type), whose emitter is connected to ground. The collector of T4 is connected through a ninth resistor R9 to the base of first transistor T1.

The base of T1 is also connected through a third capacitor C3 to ground, and to the cathode of a Zener diode D, whose anode is connected to ground. Diode D protects the circuit from voltages greater than 5 volts, in order to assure continued operation after transistory overvoltage conditions.

The emitter of T1 is connected, through a tenth resistor R10, a first inductance L1, an output terminal K1, and a second inductance L2, to the antenna bushing A of the vehicle radio.

The junction point between R10 and L1 is connected through a filter capacitor C4 to ground, and also, in a parallel connection, through a low-inductance capacitor C5 to ground.

Output terminal K1 is connected to a capacitive coupling input of an AM tuner 1, while the antenna bushing is connected through a coupling capacitor C6 to the input of an FM tuner 2.

Tenth resistor R10 serves as a measuring resistor, and its transistor-T1-adjacent terminal is connected via an eleventh resistor R11 to a second signal output terminal K2, which is also connected through a twelfth resistor R12 to ground.

The inductance-L1-adjacent terminal of R10 is connected through a thirteenth resistor R13 to a third signal output terminal K3, which is also connected through a fourteenth resistor R14 to ground.

A microprocessor 3 serves as a recognition or detection circuit; it has a pair of inputs connected respectively to signal output terminals K2 and K3.

Antenna bushing A serves for connection of either a conventional passive vehicle radio rod antenna, or an active antenna 5 including an antenna amplifier 4. The return current path for the operating current is through the cladding of an antenna cable 6 between bushing A and amplifier 4.

First inductance serves to minimize damping of the antenna signal; its preferred value depends upon the usual input frequency of the vehicle radio. Second inductance L2 serves to minimize damping of the FM or VHF signal.

MODE OF OPERATION

From the on-board vehicle network power available at operating terminal $U_B$, transistor T1 derives a filtered voltage supply for antenna amplifier 4. Resistors R1 and R3 and capacitors C1, C3, and C4 serve as filter means. Capacitor C5 serves to draw off high-frequency pulses. If the current flowing through resistor R2 exceeds a predetermined maximum value, transistor T2 becomes conductive, thereby opening transistor T4 between ground and the base of T1, thus causing T1 to block. The simultaneous turning on of transistor T3 causes a reduction of the base voltage of transistor T2, so that the base voltage of transistor T1 is connected through transistor T4 to ground and the power supplied at output terminal K1 remains shut off. Only after a turn-off and new turn-on of the on-board voltage applied at terminal $U_B$, is there power supplied again at output terminal K1.

It is possible to deliberately alter the operating state of the circuit. If a voltage pulse greater than 0.7 volts is applied at control input Se, and thus to the base of transistor T3, the power supply is shut off; conversely, if the base of T3 is connected to ground, the power supply turns on again.

If the divider ratios in voltage dividers R11/R12 and R13/R14 are chosen to be the same, the voltage values arising at signal output terminals K2 and K3 permit recognition of the respective operating states of the circuit, as follows:

If the voltage value at K2 is greater than that at K3, a current flows; an antenna amplifier is connected.

If the voltage values at K2 and K3 are the same, no current flows; a conventional rod antenna is connected.

If the voltage values at K2 and K3 are about zero, the excess current detector has shut down the circuit; the antenna conductor has a short-circuit.

The aforementioned operating states can be evaluated by the microprocessor 3 and fed to a display device. A vehicle radio equipped with the circuit of the present invention can thus recognize the presence of a conventional passive antenna and automatically shut off the unnecessary supply of power.

What is claimed is:

1. A circuit for supplying power to an antenna amplifier (4) of a vehicle radio, comprising
   a filter circuit (R1, C1; R3, C3) including a first transistor (T1) having a base, a collector, and an emitter;
   the collector-emitter path of said first transistor being interposed in a current path of said first transistor being interposed in a current path between an operating voltage terminal ($U_B$) of the radio, through a first inductance (L1) and past a first signal terminal (K1), to an antenna bushing (A) of the vehicle radio; and
   a protective circuit, containing further transistors (T2,T3,T4) which, whenever a predetermined current is exceeded, blocks said first transistor (T1) and thereby cuts off power supply to an antenna amplifier (4) being supplied with power via said antenna bushing (A);
   said protective circuit having a control input (SE) for switching said circuit into one of two stable states; and
   wherein a measuring resistance (R10) arranged in said current path has a pair of terminals which are connected respectively to second and third signal terminals (K2,K3), from which information, about the type of attached antenna and about its operating state, can be picked up.

2. A circuit according to claim 1, wherein
   said measuring resistor (R10) has a terminal adjacent said first transistor (T1) which is connected through an eleventh resistor (R11) to said second signal terminal (K2), which in turn is connected through a twelfth resistor (R12) to ground; and
   said measuring resistor (R10) has a terminal adjacent said first inductance (L1) which is connected through a thirteenth resistor (R13) to said third signal terminal (K3), which in turn is connected through a fourteenth resistor (R14) to ground.

3. A circuit according to claim 1, wherein
   said first inductance (L1) has a terminal (K1) adjacent said antenna bushing (A) which is connected to an input of an AM tuner (1) and is connected through a second inductance (L2) to said antenna bushing (A) which in turn is connected through a capacitor (C6) to an input of an FM tuner (2).

4. A circuit according to claim 1, wherein
   said first and further transistors each have a base, a collector, and an emitter;
   said first transistor (T1) is an NPN transistor;
   a second transistor (T2) is a PNP transistor and is one of said further transistors (T2,T3,T4);
   third and fourth transistors (T3,T4) are NPN transistors and are among said further transistors;
   said operating voltage terminal ($U_B$) is connected through a second resistor (R2) to the collector of said first (NPN) transistor (T1);
   the terminal of said second resistor (R2) adjacent said operating voltage terminal ($U_B$) is connected through a third resistor (R3) to the base of said first transistor (T1) and through a fourth resistor (R4) to the emitter of said second transistor (T2),
   said second transistor having a base connected through a fifth resistor (R5) to the collector of said first NPN transistor (T1) and through a sixth resistor (R6) to the collector of said third (NPN) transistor (T3), whose emitter is connected to ground;
   the base of said third transistor (T3) being connected to said control input (SE) and through a second capacitor (C2) to ground; said base of said third transistor also being connected through a seventh resistor (R7) to the collector of said second transistor (T2), said collector of said second transistor in turn being connected through an eighth resistor (R8) to the base of said fourth (NPN) transistor (T4);
   said fourth transistor having a collector connected through a ninth resistor (R9) to the base of said first transistor (T1) and to ground along two parallel paths, a first of which passes through a third capacitor (C3) and a second of which passes through a Zener diode (D).

5. A circuit according to claim 1, further comprising an evaluation circuit (3) connected to said second and third signal terminals (K2, K3), said evaluation circuit determining, from voltage signals present at said terminals, what kind of antenna, if any, is connected to said antenna bushing (A).

* * * * *